United States Patent
Awada et al.

(10) Patent No.: US 11,363,506 B2
(45) Date of Patent: Jun. 14, 2022

(54) BEAM CONSOLIDATION AND SELECTION BASED ON EXTERNAL INFORMATION

(71) Applicant: Nokia Technologies Oy, Espoo (FI)

(72) Inventors: Ahmad Awada, Munich (DE); Jedrzej Stanczak, Wroclaw (PL); Timo Koskela, Oulu (FI); Mikko Säily, Laukkoski (FI); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 38 days.

(21) Appl. No.: 16/763,510

(22) PCT Filed: Dec. 28, 2018

(86) PCT No.: PCT/IB2018/060711
§ 371 (c)(1),
(2) Date: May 12, 2020

(87) PCT Pub. No.: WO2019/138288
PCT Pub. Date: Jul. 18, 2019

(65) Prior Publication Data
US 2020/0344628 A1 Oct. 29, 2020

Related U.S. Application Data

(60) Provisional application No. 62/615,637, filed on Jan. 10, 2018.

(51) Int. Cl.
*H04W 8/22* (2009.01)
*H04W 16/28* (2009.01)
(Continued)

(52) U.S. Cl.
CPC ......... *H04W 36/0094* (2013.01); *H04W 8/22* (2013.01); *H04W 16/28* (2013.01);
(Continued)

(58) Field of Classification Search
CPC .. H04B 7/02–12; H04B 17/0082–3913; H04L 5/003–0098; H04W 16/28;
(Continued)

(56) References Cited

U.S. PATENT DOCUMENTS

2017/0034730 A1* 2/2017 Zhang ............... H04W 36/0085
2017/0208494 A1* 7/2017 Moon ................. H04B 7/0695

FOREIGN PATENT DOCUMENTS

WO 2017/123078 A1 7/2017

OTHER PUBLICATIONS

"3rd Generation Partnership Project; Technical Specification Group Radio Access Network; NR; NR and NG-RAN Overall Description; Stage 2 (Release 15)", 3GPP TS 38.300, V2.0.0, Dec. 2017, pp. 1-68.
(Continued)

*Primary Examiner* — Timothy J Weidner
(74) *Attorney, Agent, or Firm* — Nokia Technologies Oy

(57) ABSTRACT

In accordance with an example embodiment, there is disclosed a method comprising: measuring, by a user equipment, more than one communication beam established at the user equipment in a communication network; acquiring information associated with measurements of more than one communication beam established at the user equipment in the communication network; based on the information, deriving a cell measurement quantity as a function of the performed measurements of more than one communication beam.

20 Claims, 14 Drawing Sheets

(51) Int. Cl.
*H04W 24/10* (2009.01)
*H04W 36/00* (2009.01)
*H04W 36/24* (2009.01)
*H04W 36/30* (2009.01)
*H04W 72/04* (2009.01)
*H04W 72/06* (2009.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ......... *H04W 24/10* (2013.01); *H04W 36/245* (2013.01); *H04W 36/30* (2013.01); *H04W 72/042* (2013.01); *H04W 72/046* (2013.01); *H04W 72/06* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 24/02–10; H04W 36/0005–385; H04W 72/005–14; H04W 74/002–008; H04W 84/02–16; H04W 88/02–10; H04W 92/02; H04W 92/04; H04W 92/10
See application file for complete search history.

(56) References Cited

OTHER PUBLICATIONS

"3rd Generation Partnership Project Technical Specification Group Radio Access Network NR Radio Resource Control (RRC) Protocol specification (Release 15)", 3GPP TS 38.331, V0.4.0, Dec. 2017, pp. 1-187.
International Search Report and Written Opinion received for corresponding Patent Cooperation Treaty Application No. PCT/IB2018/060711, dated Apr. 10, 2019, 13 pages.
"[99-bis#20][NR] TP on RRM (Ericsson)", 3GPP TSG-RAN WG2 #100, Tdoc R2-1714128, Agenda : 10.4.1.4.1, Ericsson, Nov. 27-Dec. 1, 2017, 88 pages.
"TP to Stage-2 on Measurements", 3GPP TSG-RAN WG2 #100, Tdoc R2-1713597, Agenda : 10.2.19, Ericsson, Nov. 27-Dec. 1, 2017, pp. 1-4.
"Beam selection and consolidation enhancements", 3GPP TSG-RAN WG2 Meeting #103, R2-1812317, Agenda : 10.4.1.4.6, Nokia, Aug. 20-24, 2018, 10 pages.

* cited by examiner

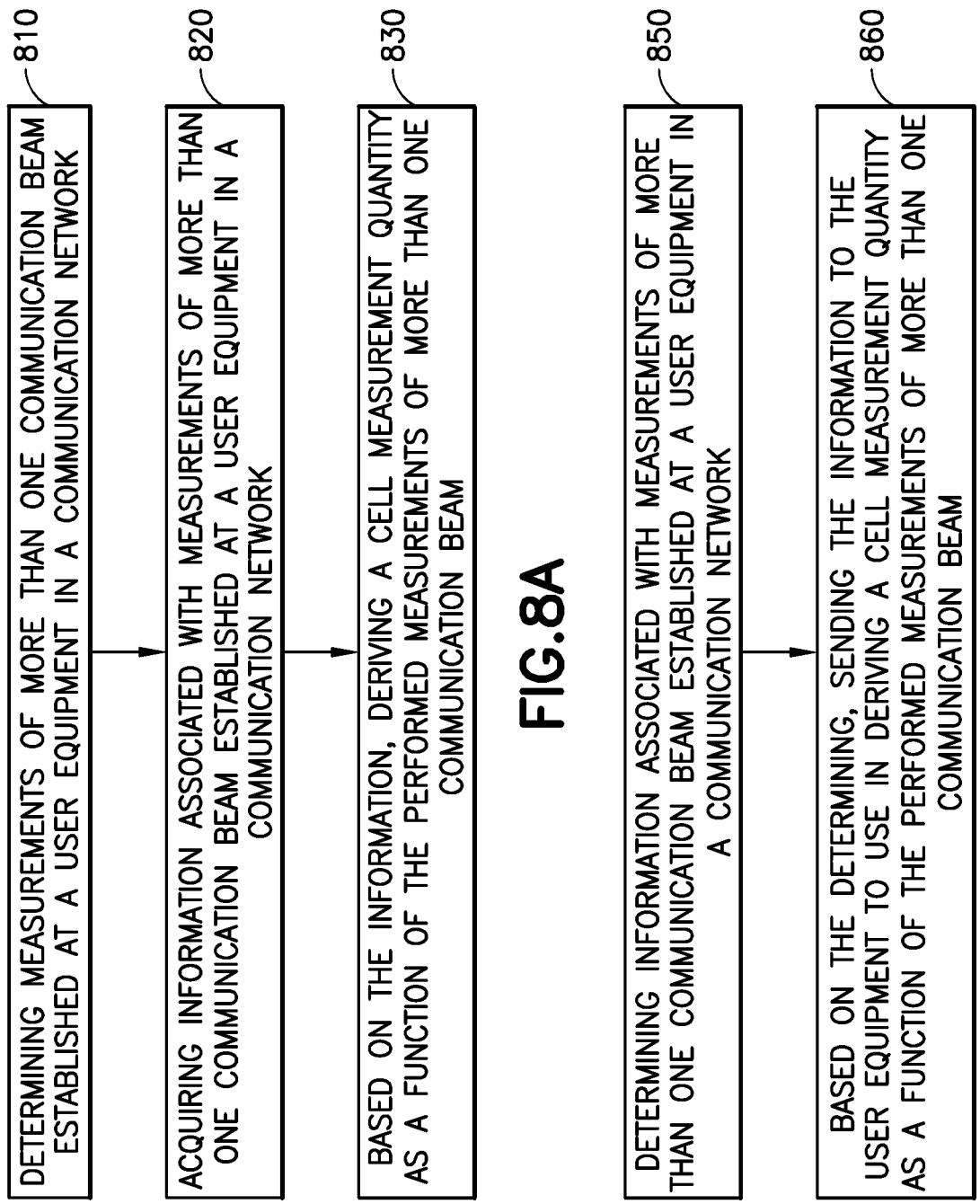

BEAM CONSOLIDATION AND SELECTION BASED ON EXTERNAL INFORMATION

RELATED APPLICATION

This application claims priority to PCT Application No. PCT/IB2018/060711 filed Dec. 28, 2018, which claims priority benefit to U.S. Provisional Application No. 62/615,637 filed Jan. 10, 2018, each of which is incorporated herein by reference in its entirety.

TECHNICAL FIELD

The teachings in accordance with the exemplary embodiments of this invention relate generally to beam consolidation and selection and, more specifically, relate to beam consolidation and selection for deriving a cell measurement quantity that can be used in the evaluation of measurement reporting criteria and triggering an inter-cell handover in New Radio (NR) systems.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CSI-RS Channel State Information-Reference Signal
gNB NR NodeB
IE Information Element
L1 Layer 1
L3 Layer 3
MME Mobility Management Entity
NCE Network Control Element
NR NR Radio Access
NR-SS NR-Synchronization Signal
RRC Radio Resource Control
SGW Serving Gateway
SS/PBCH Synchronization Sequences and Physical Broadcast Channel
UE User Equipment FIG. 1 shows a measurement model as specified in Figure 9.2.4-1 of 3GPP TS 38.300. FIG. 1 shows the physical layer measurements carried by a UE with respect to a NR Node B (gNB), denoted by gNB beam 1, 2, . . . , K (point A in FIG. 1), correspond to the measurements on NR-Synchronization Signal (NR-SS) block or Channel State Information-Reference Signal (CSI-RS) configured for L3 mobility by gNB and detected by UE at Layer 1 (L1). L1 filtering is applied to these physical layer measurements resulting in measurements available at point $A^1$ in FIG. 1. However, problems of this measurement model can start to occur when the UE has more than one relevant beam with similar received power.

The example embodiment of the invention as described herein builds on top of the 3GPP measurement model to at least address the problems as stated above.

SUMMARY

Various aspects of examples of the invention are set out in the claims.

According to a first aspect of the present invention, a method comprising: measuring, by a user equipment, more than one communication beam established at the user equipment in a communication network; acquiring information associated with measurements of more than one communication beam established at the user equipment in the communication network; based on the information, deriving a cell measurement quantity as a function of the performed measurements of more than one communication beam.

According to a second aspect of the present invention, an apparatus comprising: at least one processor; and at least one memory including computer program code, wherein the at least one memory and the computer program code are configured to, with the at least one processor, cause the apparatus to perform at least the following: measurements of more than one communication beam established at a user equipment in a communication network; acquiring information associated with measurements of more than one communication beam established at the user equipment in the communication network; based on the information, deriving a cell measurement quantity as a function of the performed measurements of more than one communication beam.

According to a third aspect of the present invention, A non-transitory computer storage medium encoded with a computer program, the program comprising instructions that when executed by one or more computers cause the one or more computers to perform operations comprising: measuring more than one communication beam established at a user equipment in a communication network; acquiring information associated with measurements of more than one communication beam established at the user equipment in the communication network; based on the information, deriving a cell measurement quantity as a function of the performed measurements of more than one communication beam.

According to a fourth aspect of the present invention, an apparatus comprising: at least one processor; and at least one memory including computer program code, wherein the at least one memory and the computer program code are configured to, with the at least one processor, cause the apparatus to perform at least the following: determining information associated with measurements of more than one communication beam established at a user equipment in a communication network; and based on the determining, sending the information to the user equipment to use in deriving a cell measurement quantity as a function of the performed measurements of more than one communication beam.

BRIEF DESCRIPTION OF THE DRAWINGS

The foregoing and other aspects of embodiments of this invention are made more evident in the following Detailed Description, when read in conjunction with the attached Drawing Figures, wherein:

FIGS. 8A and 8B each show a method in accordance with the exemplary embodiments which may be performed by an apparatus.

DETAILED DESCRIPTION

In this invention, there is proposed a novel approach to beam consolidation and selection for deriving a cell measurement quantity that can be used in the evaluation of measurement reporting criteria and triggering an inter-cell handover in New Radio (NR) systems.

Figure 1:
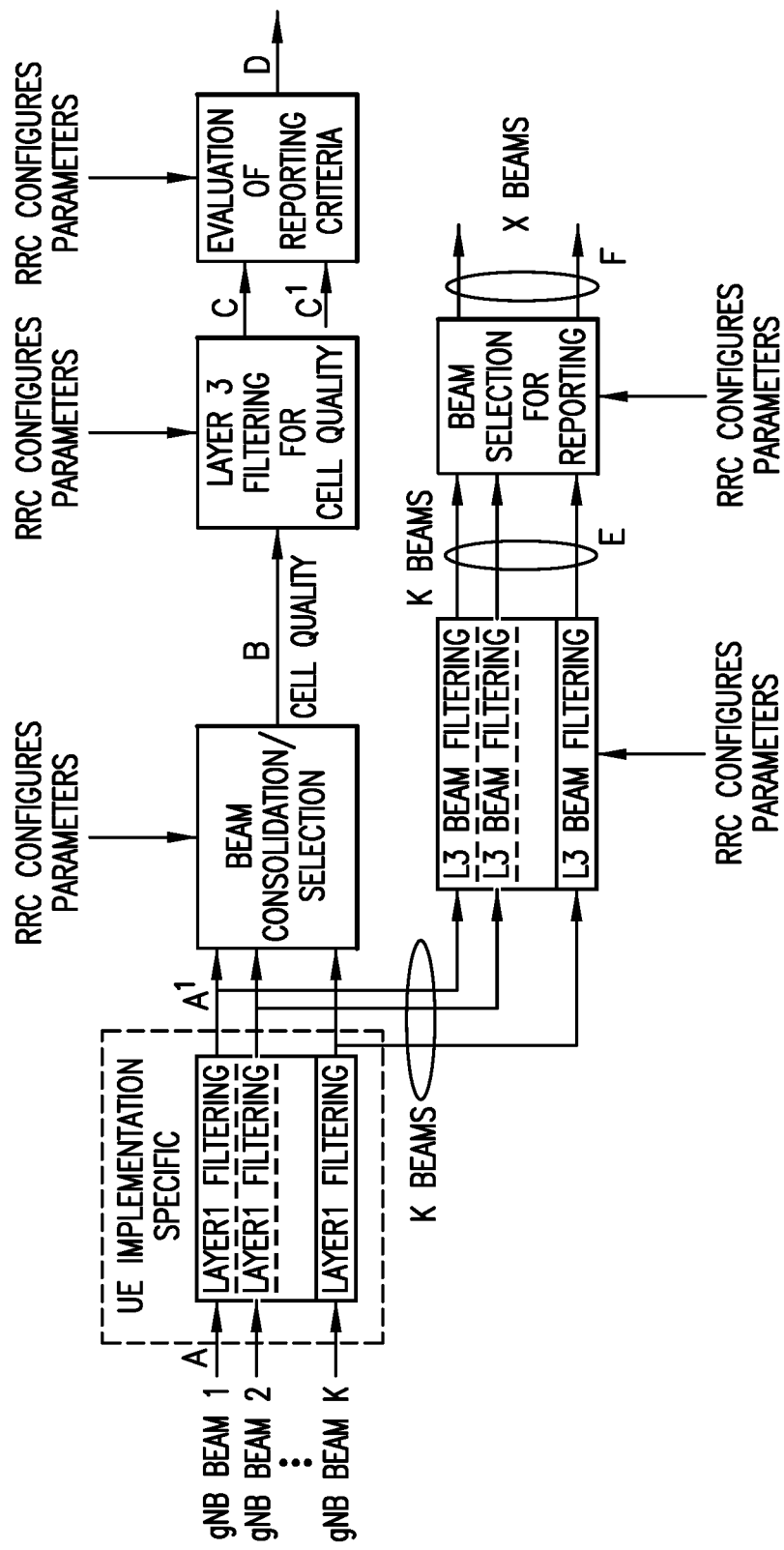
FIG. 1 shows a measurement model specified in 3GPP TS 38.300.

As stated above, FIG. 1 shows a measurement model as specified in Figure 9.2.4-1 of 3GPP TS 38.300. FIG. 1 shows the physical layer measurements carried by a UE with respect to a NR Node B (gNB), denoted by gNB beam 1, 2, . . . , K (point A in FIG. 1), correspond to the measurements on NR-Synchronization Signal (NR-SS) block or Channel State Information-Reference Signal (CSI-RS) configured for L3 mobility by gNB and detected by UE at Layer 1 (L1). L1 filtering is applied to these physical layer measurements resulting in measurements available at point $A^1$ in FIG. 1. The exact L1 filtering procedure is not constrained by the standard and is implementation dependent.

The L1 filtered beam measurements (point $A^1$) are consolidated to derive a cell measurement quality of point B. The steps of the beam consolidation/selection procedure are standardized in 3GPP TS 38.331. Basically, the UE shall derive the cell measurement quantity as the linear average of the power values of the highest L1 beam measurements that are above threshold T where the total number of averaged beams shall not exceed N. The configuration of parameters T and N is provided to the UE by RRC signaling. In the special cases, when:
1) N=1; or
2) N is not configured; or
3) T is not configured; or
4) if the highest L1 beam measurement is below T;
then the UE takes the highest L1 beam measurement as the highest cell measurement.

The derived cell measurement quantity (point B) is fed in to Layer 3 (L3) filtering procedure resulting in measurement of point C in FIG. 1. The L3 filtering can be performed using the following formula:

$$F_n = (1-a) \cdot F_{n-1} = a \cdot M_n \quad (1)$$

where:
$M_n$ is the latest received cell measurement quantity from the physical layer (point B in FIG. 1);
$F_n$ is the updated filtered measurement result;
$F_{n-1}$ is the old filtered measurement result, where $F_0$ is set to $M_1$ when the first measurement result from the physical layer is received; and
$a = \frac{1}{2}^{(k/4)}$, where k is the filter coefficient that is received using RRC signaling.

The output of L3 filtering, measurement $F_n$ of point C, is used in the evaluation of reporting criteria or for measurement reporting. For instance, the UE can use the L3 filtered cell measurement to check if the conditions of configured measurement events are fulfilled and whether it needs to send a measurement report to the network.

Parallel to the upper branch of FIG. 1 that is used for deriving an L3 cell measurement quantity, the lower branch is used to derive L3 beam measurement quantities that can be reported to the network. Each L1 beam measurement of point $A^1$ is filtered using a separate L3 beam filter according to the aforementioned Eq. (1), resulting in L3 beam measurement of point E. The configuration parameters of L3 beam filters, such as filter coefficients, are provided by RRC signaling. Finally, a subset of X L3 beam measurements (point F) is selected for reporting to the network.

Example embodiments of the invention focus on the situation when the total number of averaged beams considered in beam consolidation and selection shall not exceed N=1. This invention covers as well the cases when 1) N is not configured or 2) T is not configured or 3) if the highest L1 beam measurement is below T.

Figure 3A:
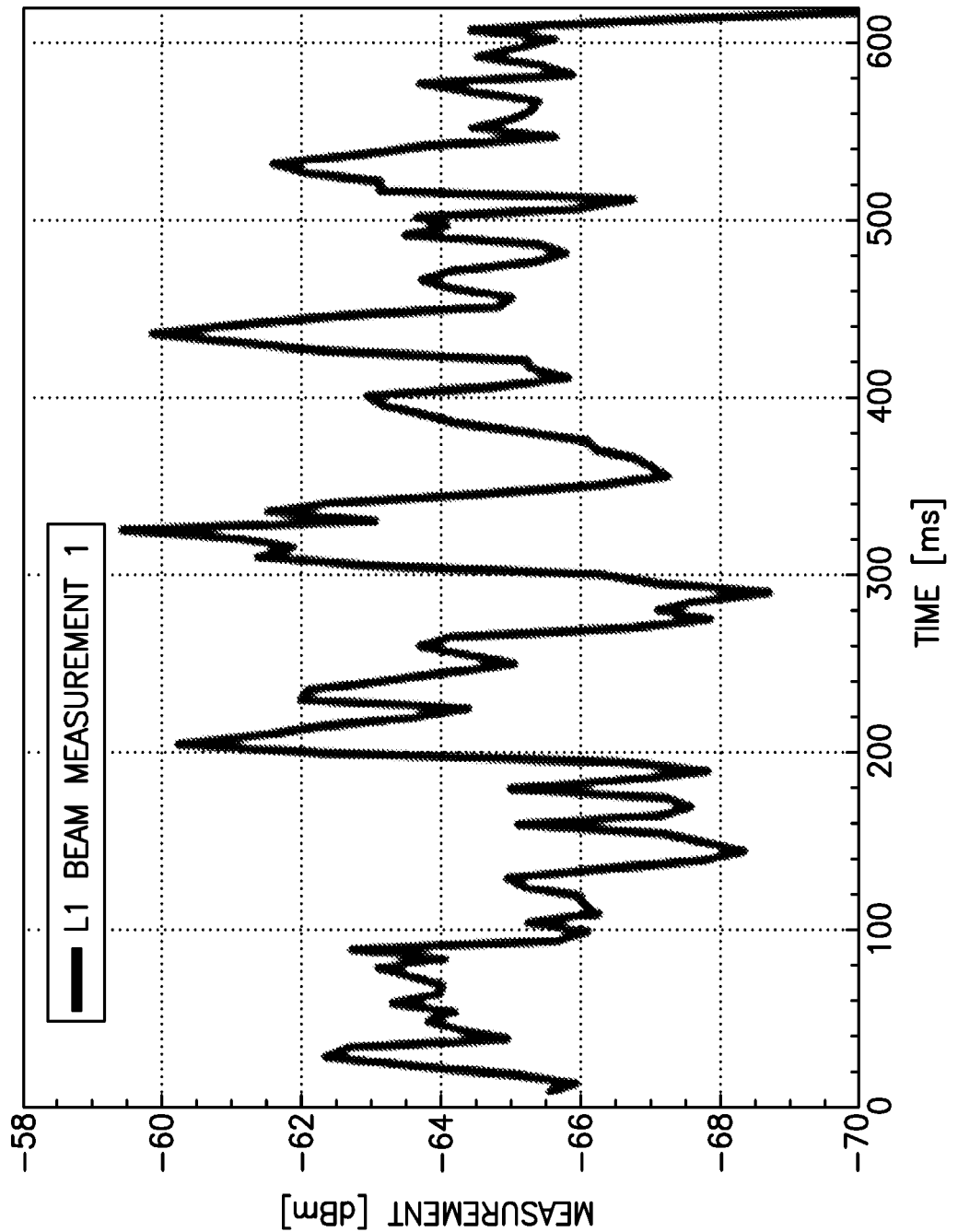
FIGS. 3A, 3B, and 3C shows a case when the UE has only one relevant beam (beam 1)

For instance, consider in FIG. 3 an example where the UE has one relevant/strong beam (beam 1) among the detected ones. In this case, the L1 cell measurement shown in solid line in FIG. 3a corresponds to L1 measurement of beam 1 that is shown in dashed line, i.e., overlapping curves.

Figure 3B:
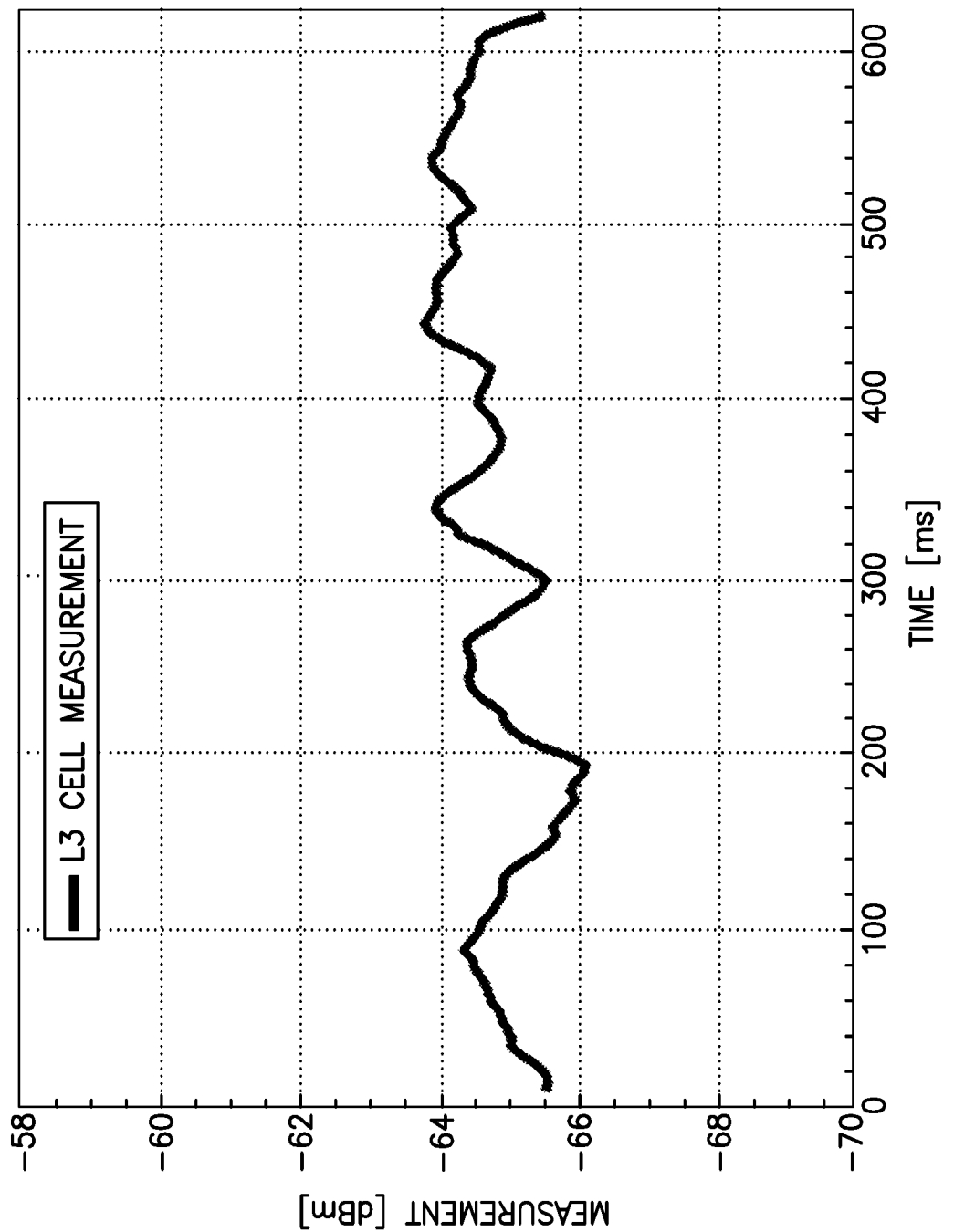
Figure 3C:
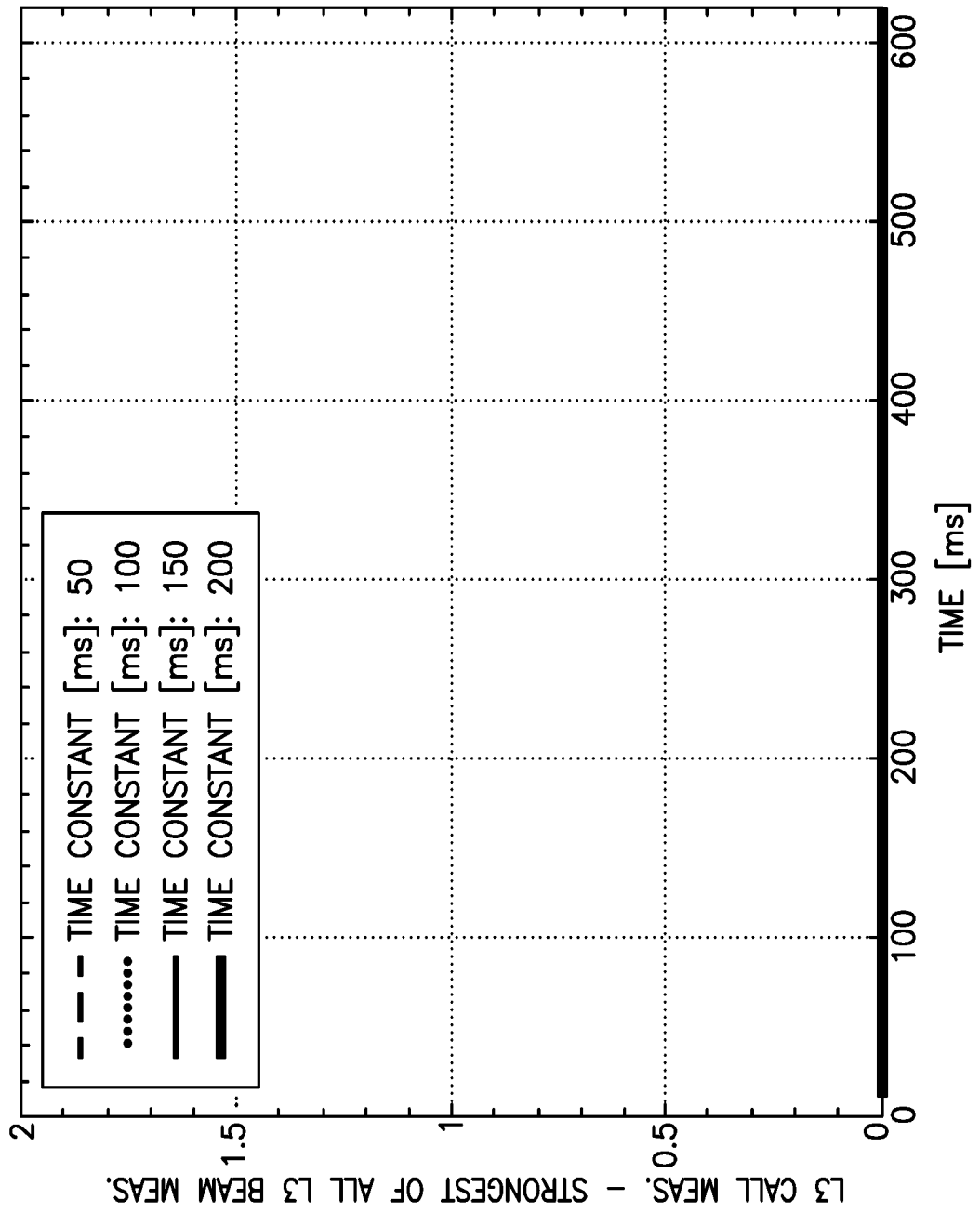

Consequently, the L3 cell measurement (point C of FIG. 1) corresponds to L3 measurement of beam 1 (point E of FIG. 1) as shown FIG. 3b. In this case, the difference between the L3 cell measurement and the strongest of all L3 beam measurements is zero at all time instances as shown in FIG. 3c for all time constants, i.e., time constant is the time after which the filter factor (1-a) becomes half. The higher the time constant, the larger is the time window used in filtering.

Figure 4A:
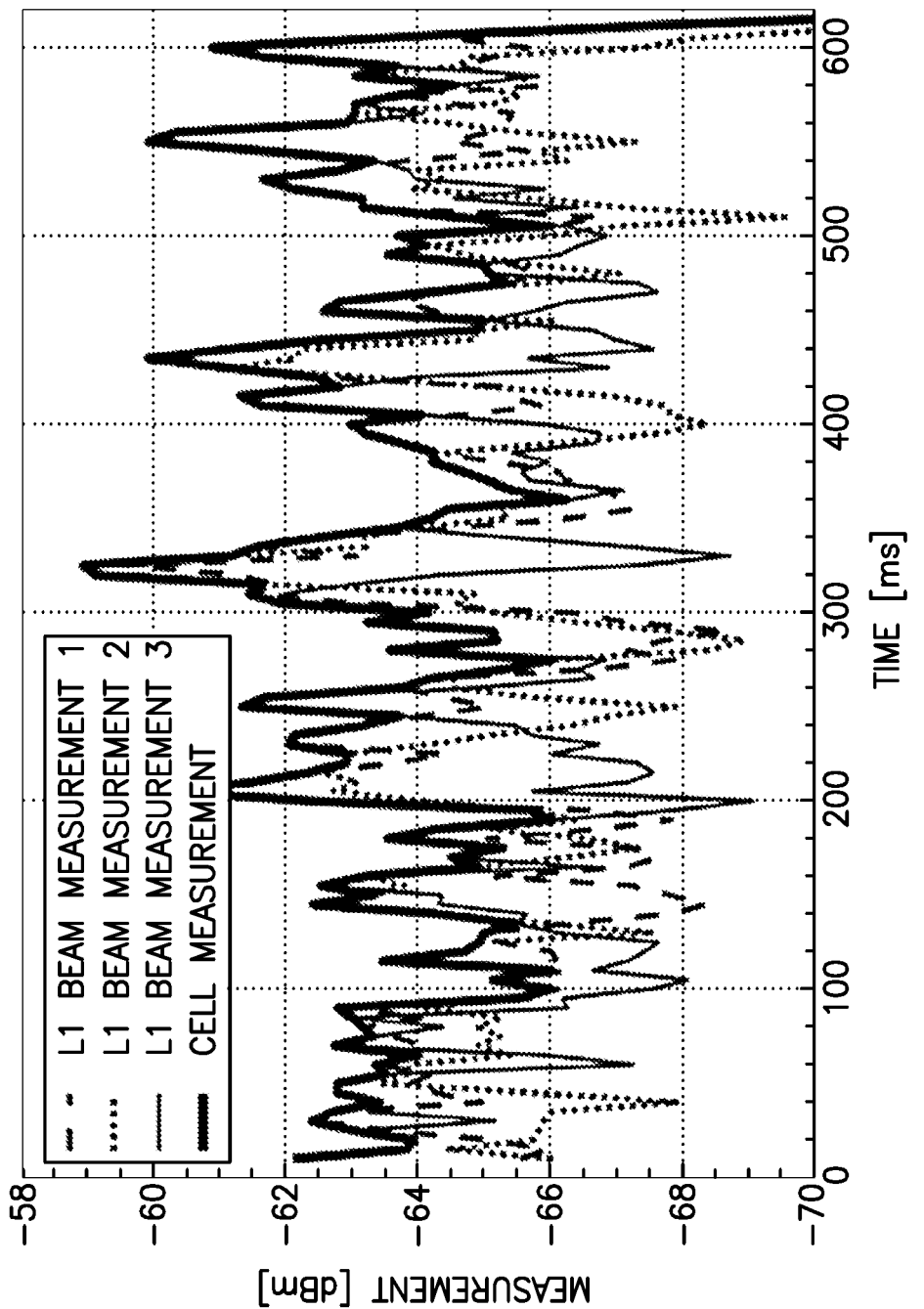
FIGS. 4A, 4B, and 4C shows a case when the UE has three relevant beams 1, 2, and 3 with similar measurements.
Figure 4B:
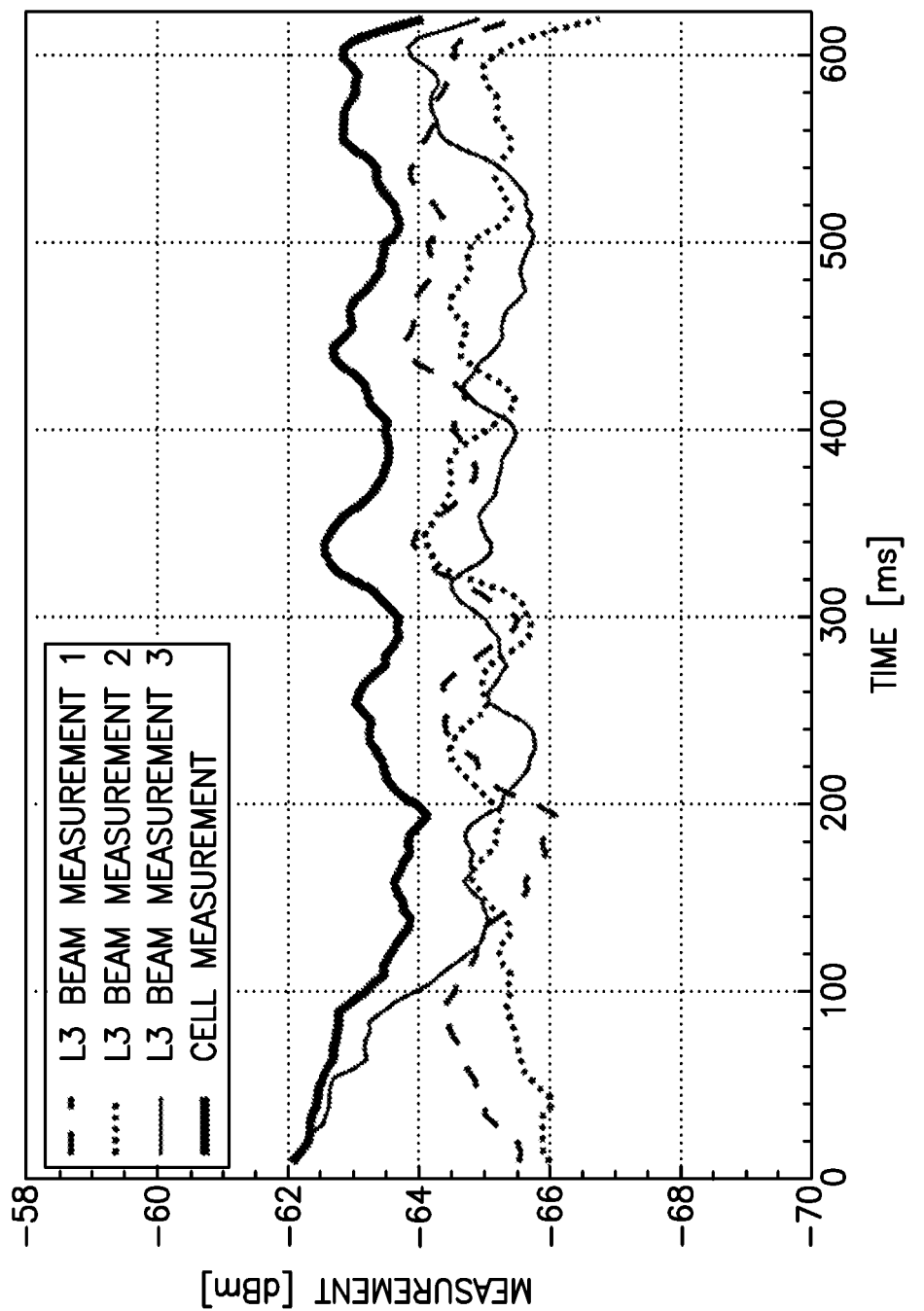
Figure 4C:
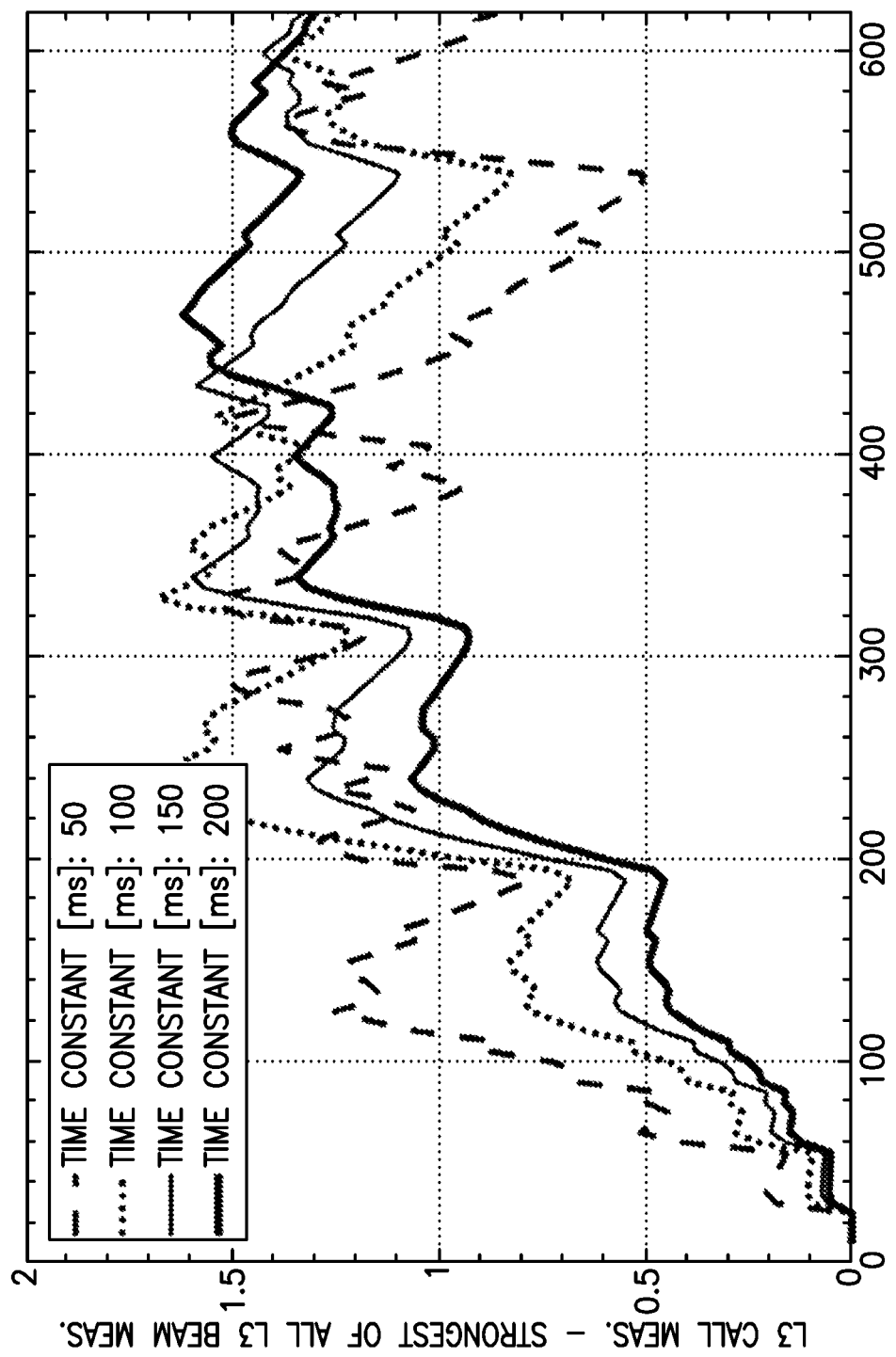

However, problems start to occur when the UE has more than one relevant beam with similar received power. This is illustrated in FIG. 4 where the UE has three relevant beams (beam 1, 2 and 3) with similar measurements. In FIG. 4a, the L1 cell measurement corresponds to the envelope of the three L1 beam measurements. Taking the envelope results in L3 cell measurement that is higher than all other L3 beam measurements. This is reflected in FIG. 4c which shows that the difference between the L3 cell measurement and the strongest of all L3 beam measurements at each time instance.

This difference (bias) between the L3 cell measurement and the relevant L3 beam measurements can lead to problems during the inter-cell handover when the number N of beams to be averaged is 1. For instance, consider the following two cases below.

Case 1: The L3 cell measurement of source cell does not have a bias whereas the L3 cell measurement of target cell is biased.

This can happen if the UE detects one strong beam from source cell and multiple relevant beams with similar received power from target cell. In this case, the target cell would appear stronger than it is in reality which may lead the UE to trigger the handover earlier to the target cell than it should be resulting in so-called "too-early handover", i.e. failure caused by handing over the UE early to an unstable target cell.

Case 2: The L3 cell measurement of source cell is biased whereas the L3 cell measurement of target cell does not have a bias.

This can happen if the UE detects multiple relevant beams with similar received power from source cell and one strong beam from target cell. In this case, the source cell would appear stronger than it is in reality which may lead the UE to trigger the handover later to the target cell than it should be resulting in so called "too-late handover", i.e. failure caused by handing over the UE late to the target cell.

To overcome these issues, the invention proposes new means that can reduce the difference/bias between the L3 cell measurement and the strongest L3 beam measurements.

In current 3GPP solution the UE shall derive the cell measurement quantity as the linear average of the power values of the highest L1 beam measurements that are above threshold T where the total number of averaged beams shall not exceed N. In other words, the beams that are selected for the derivation of the cell measurement correspond to those having the highest L1 beam measurements that are above threshold T.

The example embodiments of the invention provide a modification to the current beam consolidation/selection procedure that is specified in 3GPP. In accordance with the example embodiments of the invention the UE still derives the cell measurement quantity as the linear average of the power values of L1 beam measurements, however, the selection of the beams used in deriving the cell measurement quantity is based on some external information that is fed to the beam consolidation module. Herein, the UE does not necessarily select the beam(s) with the highest L1 beam measurement(s) that are above a threshold T for deriving a cell measurement quality.

Figure 2:
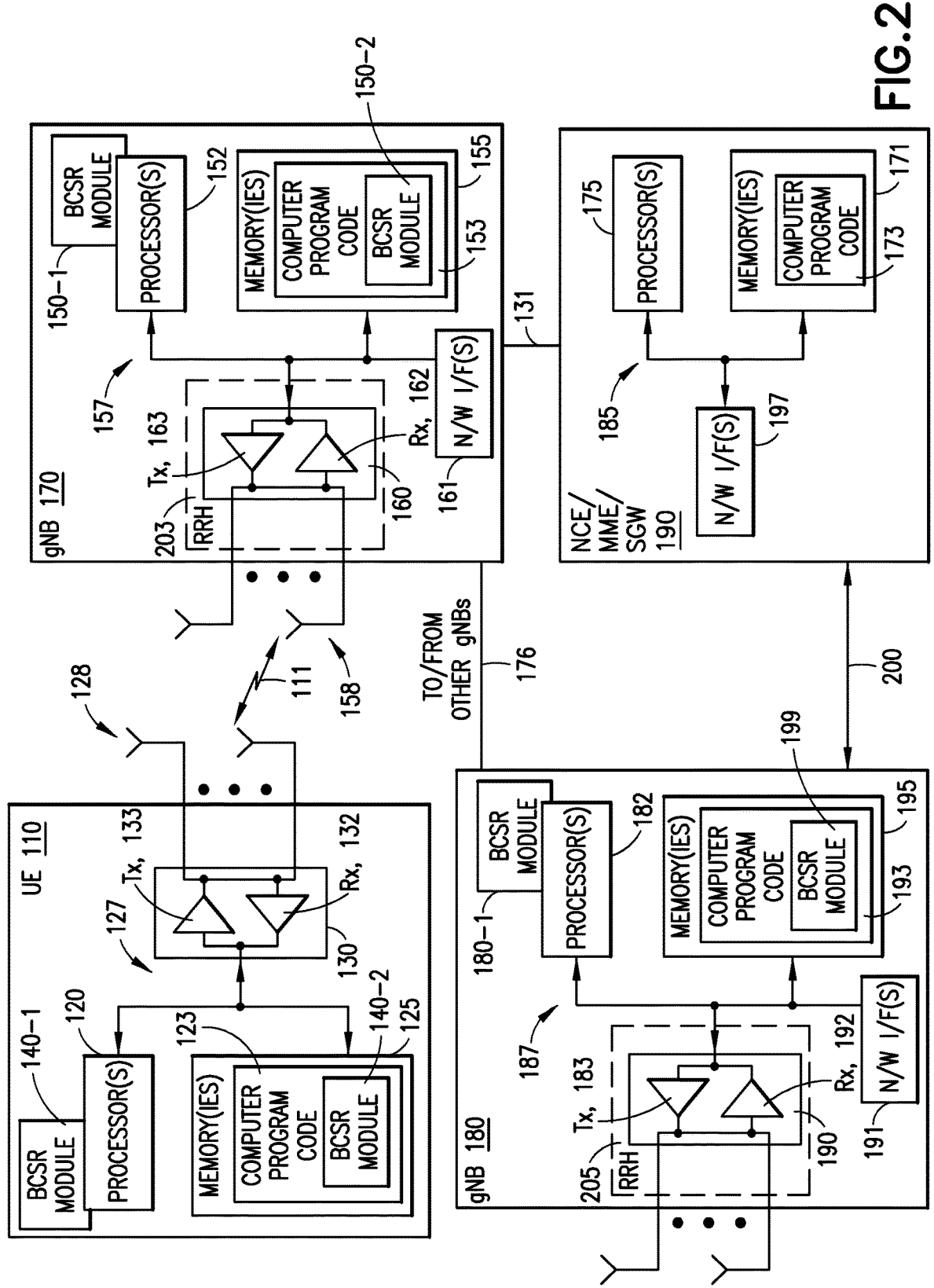
FIG. 2 shows a block diagram of one possible and non-limiting exemplary system in which the example embodiments of the invention may be practiced.

Before describing the example embodiments of the invention in detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a BCSR (beam consolidation/selection/reporting) module 140 which is configured to perform the example embodiments of the invention as described herein. A BCSR module 140 comprising one of or both parts 140-1 and/or 140-2, which may be implemented in a number of ways. The BCSR module 140 may be implemented in hardware as BCSR module 140-1, such as being implemented as part of the one or more processors 120. The BCSR module 140-1 may be implemented also as an integrated circuit or through other hardware such as a programmable gate array. In another example, the BCSR module 140 may be implemented as BCSR module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for NR or LTE long term evolution) that communicates with devices such as gNB 180 and UE 110 of FIG. 2. The gNB 170 provides access to wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a BCSR module 150 which is configured to perform example embodiments of the invention as described herein. The BCSR module 150 comprising one of or both parts 150-1 and/or 150-2, which may be implemented in a number of ways. The BCSR module 150 may be implemented in hardware as BCSR module 150-1, such as being implemented as part of the one or more processors 152. The BCSR module 150-1 may be implemented also as an integrated circuit or through other hardware such as a programmable gate array. In another example, the BCSR module 150 may be implemented as BCSR module 150-2, which is implemented as computer program code 153 and is executed by the one or more processors 152. For instance, the one or more memories 155 and the computer program code 153 are configured to cause, with the one or more processors 152, the gNB 170 to perform one or more of the operations as described herein. The one or more network interfaces 161 communicate over a network such as via the links 176 and 111. Two or more gNB 170 may communicate with another gNB or eNB using, e.g., link 176. The link 176 may be wired or wireless or both and may implement, e.g., an X2 interface. Further the link 176 may be through other network devices such as, but not limited to an NCE (Network Control Element)/MME (Mobility Management Entity)/SGW (Serving Gateway) device such as the NCE/MME/SGW 190 of FIG. 2.

The gNB 180 (NR/5G Node B or possibly an evolved NB) is a base station such as a master node base station (e.g., for NR or LTE long term evolution) that communicates with devices such as the gNB 170 and/or UE 110 and/or the wireless network 100. The gNB 180 includes one or more processors 182, one or more memories 195, one or more network interfaces (N/W I/F(s)) 191, and one or more transceivers 190 interconnected through one or more buses 187. Each of the one or more transceivers 190 includes a receiver Rx 192 and a transmitter Tx 183. The one or more transceivers 190 are connected to one or more antennas 185. The one or more memories 195 include computer program code 193. The gNB 180 also includes a BCSR module 199 which is configured to perform example embodiments of the invention as described herein. The BCSR module 199 may be implemented in hardware as BCSR module 180-1, such as being implemented as part of the one or more processors 182. The BCSR module 180-1 may be implemented also as an integrated circuit or through other hardware such as a programmable gate array. In another example, the BCSR module 180-1 may be implemented as BCSR module 199, which is implemented as computer program code 193 and is executed by the one or more processors 182. For instance, the one or more memories 155 and the computer program code 153 are configured to cause, with the one or more processors 182, the gNB 180 to perform one or more of the operations as described herein. The one or more network interfaces 181 communicate over a network such as via the link 176. Two or more gNB 170 or gNB 180 may communicate with another gNB and/or eNB or any other device using, e.g., link 176. The link 176 maybe wired or wireless or both and may implement, e.g., an X2 interface. Further, as stated above the link 176 may be through other network devices such as, but not limited to an NCE/MME/SGW device such as the NCE/MME/SGW 190 of FIG. 2.

The one or more buses 157 and 187 may be address, data, or control buses, and may include any interconnection mechanism, such as a series of lines on a motherboard or integrated circuit, fiber optics or other optical communication equipment, wireless channels, and the like. For example, the one or more transceivers 160 and/or 190 may be implemented as a remote radio head (RRH) 203 and/or 205, with the other elements of the gNB 170 being physically in a different location from the RRH, and the one or more buses 157 could be implemented in part as fiber optic cable to connect the other elements of the gNB 170 to a RRH.

It is noted that description herein indicates that "cells" perform functions, but it should be clear that the gNB that forms the cell will perform the functions. The cell makes up part of a gNB. That is, there can be multiple cells per gNB.

The wireless network 100 may include an NCE 190 that may include MME SGW functionality, and which provides connectivity with a further network, such as a telephone network and/or a data communications network (e.g., the Internet). The gNB 170 is coupled via a link 131 to the NCE 190. The gNB 180 is coupled via a link 200 to the NCE 190. Further, the gNB 180 is coupled via link 176 to the gNB 170. The links 131, 176, and/or 200 may be implemented as, e.g., an S1 interface.

The NCE 190 includes one or more processors 175, one or more memories 171, and one or more network interfaces (N/W I/F(s)) 197, interconnected through one or more buses coupled with the link 185. The one or more memories 171 include computer program code 173. The one or more memories 171 and the computer program code 173 are configured to, with the one or more processors 175, cause the NCE 190 to perform one or more operations which may be needed to support the operations in accordance with the example embodiments of the invention.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152, 182, or 175 and memories 155, 195, and 171, and also such virtualized entities create technical effects.

The computer readable memories 125, 155, 171, and 195 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 195 may be means for performing storage functions. The processors 125, 155, 171, and 195 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 182 may be means for performing functions, such as controlling the UE 110, gNB 170, gNB 180, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Implementation details of the example embodiments of the invention are given below along with numerical results showing the benefits of the proposed solution.

Option 1

In option 1, the external information consists of the L3 beam measurements that are used as well for reporting the beam measurements. That is the UE derives the cell measurement quantity as the linear average of the power values of the L1 beam measurements corresponding to highest L3 filtered beam measurements that are above threshold $T_{L3}$ where the total number of averaged beams shall not exceed $N_{L3}$.

The configuration of the parameters $N_{L3}$ and $T_{L3}$ is provided by RRC signaling to the UE where $N_{L3}$ is smaller or equal to K. $N_{L3}$ and $T_{L3}$ could be set to N and T, respectively. Alternatively, both parameters $N_{L3}$ and $T_{L3}$ could be the same physical parameters as N and T, respectively.

Figure 5:
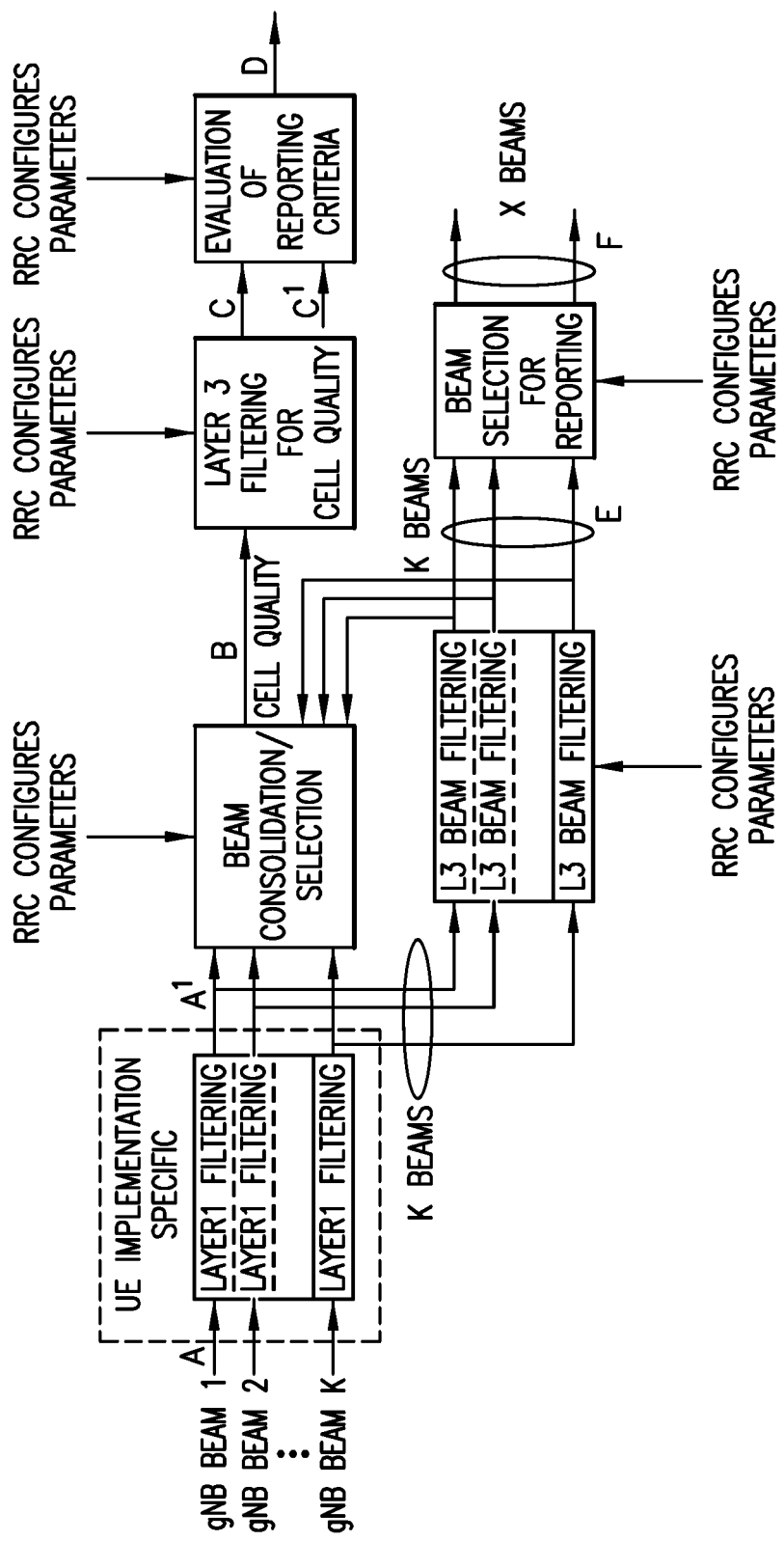
FIG. 5 shows a measurement model with external information consisting of L3 beam measurements that are used as well for beam reporting.

The changes that are required for this option are shown in FIG. 5.

Option 2

In the second option, the external information consists of filtered L1 beam measurements that are different from the L3 beam measurement (point E). That is the UE derives the cell measurement quantity as the linear average of the power values of the L1 beam measurements corresponding to highest filtered L1 beam measurements that are above threshold T' where the total number of averaged beams shall not exceed N'. In this option:

The configuration of the parameters N' and T' is provided by RRC signaling to the UE. N' and T' could be set to N and T, respectively; and The filter coefficient of each beam measurement that is used as external information for beam consolidation is provided by RRC signaling, i.e., this is different from the filter coefficient that is specified for L3 beam measurement which is used in beam report (point F of FIG. 1).

Figure 6:
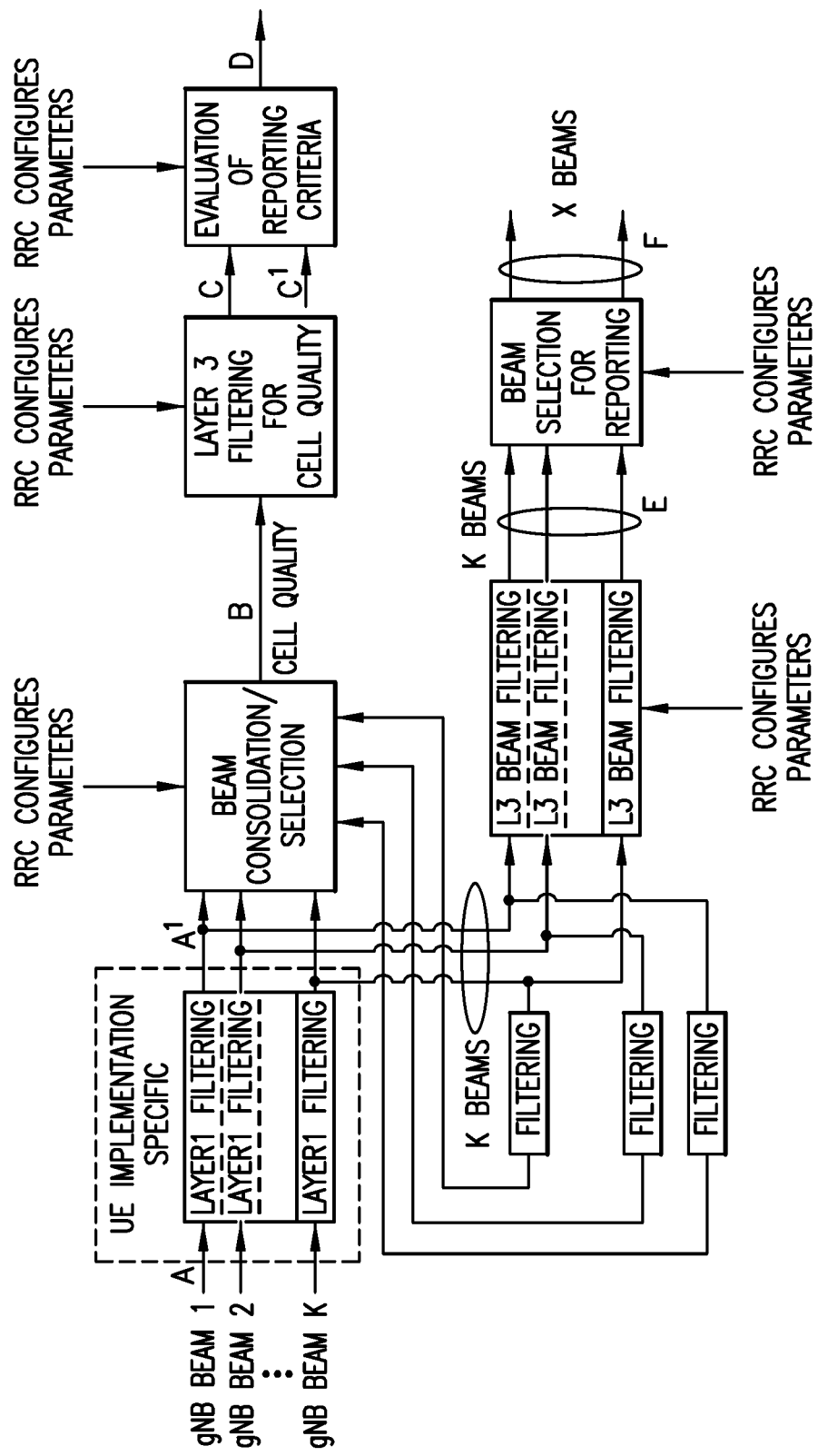
FIG. 6 shows a measurement model with external information consists of filtered L1 beam measurements that are different from the L3 beam measurements.

The changes that are required for this option are shown in FIG. 6:

One advantage of Option 1 over Option 2 is that there is no need to define additional beam filters for L1 measurements.

Option 3

For both implementation (option 1 and/or option 2), the network can configure the UE to use either the "external information" (e.g. Option 1) or to fall back to current 3GPP solution. For example, the following changes (indicated in italics below) could be specified in TS 38.331:
2> if the use of external information is not configured;
   3> derive each cell measurement quantity based on SS/PBCH block as the linear average of the power values of the highest beam measurement quantity values above absThreshSS-Blocks Consolidation where the total number of averaged beams shall not exceed nroSS-BlocksToAverage;
2> else
   3> derive each cell measurement quantity based on SS/PBCH block as the linear average of the power values of the beam measurement quantity values corresponding to the highest L3 filtered beam measurement quantity values above absThreshSS-BlocksConsolidation_L3 where the total number of averaged beams shall not exceed nroSS-BlocksToAverage_L3.
where absThreshSS-BlocksConsolidation_L3 and nroSS-BlocksToAverage_L3 correspond to $T_{L3}$ and $N_{L3}$, respectively, as stated above.

Option 4

Alternatively, it could be left for the UE implementation to decide whether to use external information (e.g. Option 1). For example, the following changes (in italics) could be specified in TS 38.331 [2]:
   3> derive each cell measurement quantity based on SS/PBCH block either as the linear average of the power values of the highest beam measurement quantity values above absThreshSS-BlocksConsolidation, or as the linear average of the power values of the beam measurement quantity values corresponding to the highest L3 filtered beam measurement quantity values above absThreshSS-BlocksConsolidation_L3, where the total number of averages beams shall not exceed nroSS-BlocksToAverage.

Option 5

The network may also indicate to the UE which external information to use in the selection of the beams used for beam consolidation, i.e., L3 beam measurements of option 1 or filtered L1 beam measurements of option 2. This can be implemented using an Information Element (IE) with a choice format, e.g.,

```
externalInfoType ::=           CHOICE {
    layer3_beam_measurements       Layer3_beam_measurements,
    filtered_layer1_measurements   Filtered_layer1_measurements
}
```

Option 6

The UE may indicate to the network its capability on whether it is able to use external information in the beam consolidation/selection module.

Option 7

The UE applies the external information 1) if the number N of averaged beams is set to 1 or 2) if the number N of averaged beams is not configured or 3) if the threshold T is not configured or 4) if the highest L1 beam measurement is below T. These are all the cases where the number of beams to be averaged is 1.

Option 8

The UE applies the external information if more than one relevant beam with similar received power is detected by physical layer. In this option:
   The network may configure the number R of relevant beams with similar received powers for applying the external information; and/or The UE can detect if a L1 beam filtered measurement is similar to another by checking for instance if it falls within a window offset Y from the maximum detected L1 beam measurement. The configuration of the window offset Y can be as well provided by the network using RRC signaling.

For illustration, consider the previous option above where the UE as three relevant beams (beam 1, 2 and 3) with similar measurements.

Figure 7A:
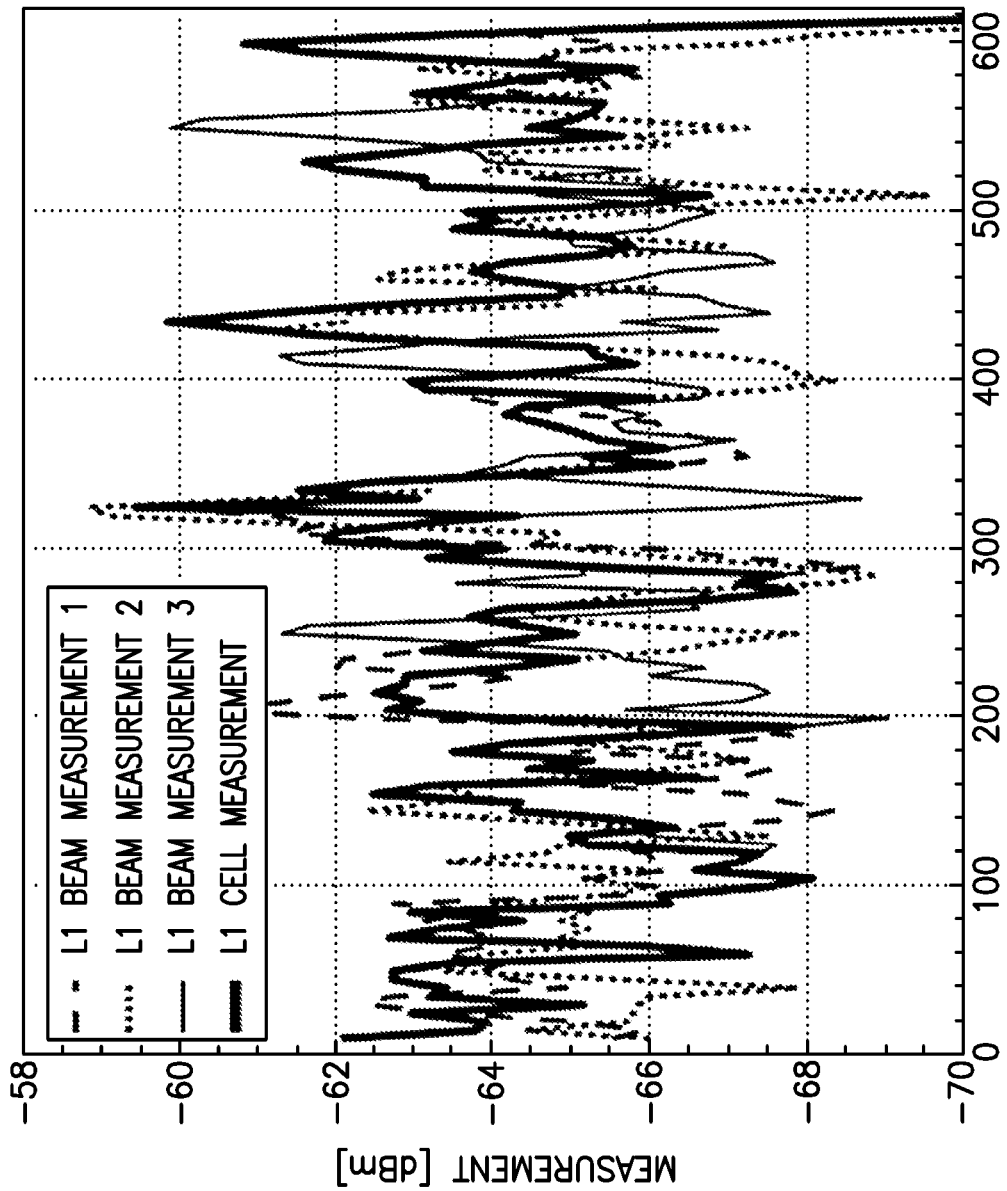
FIGS. 7A, 7B, and 7C shows a case where the UE applies the external information for deriving the L1 cell measurement based on L1 beam measurements among which three beam measurements are relevant (beam 1, 2 and 3) with similar received powers.
Figure 7B:
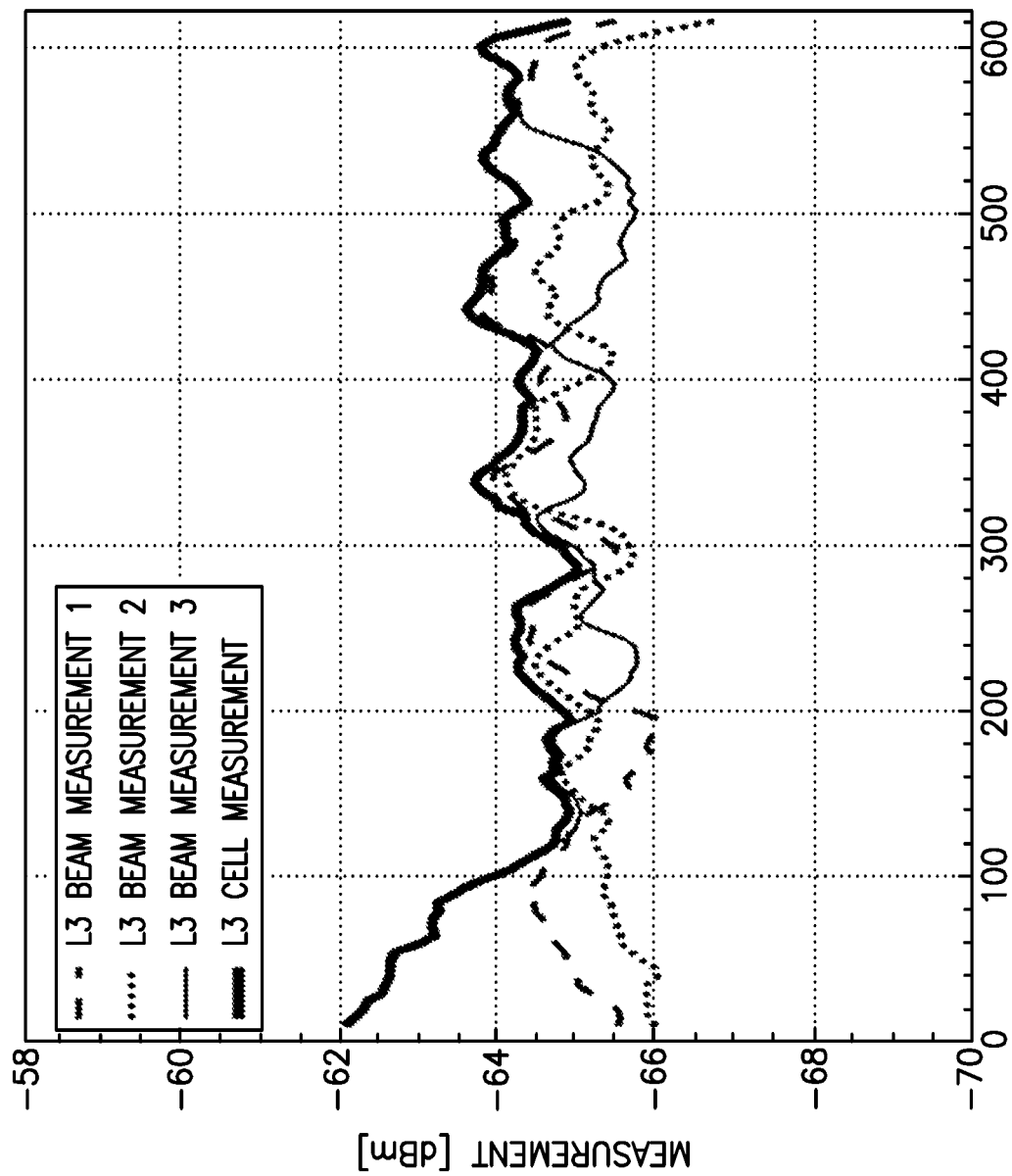
Figure 7C:
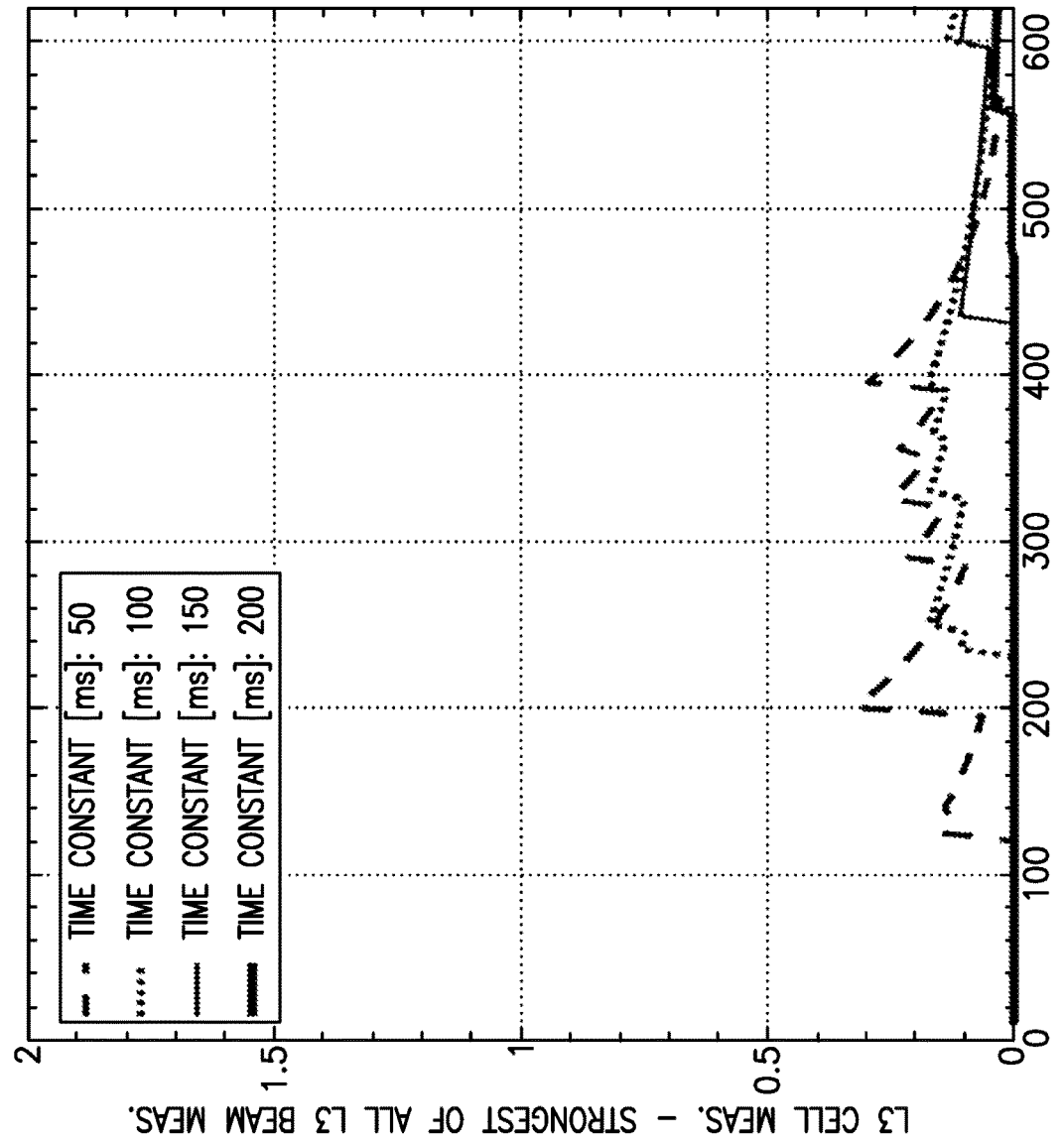

For deriving the L1 cell measurement in FIG. 7a, the UE uses as external information the L3 beam measurements filtered with a time constant of e.g. 50 ms. It is shown that the L1 cell measurement does not necessarily follow the envelope of the strongest L1 beam measurement. Moreover, comparing FIG. 7b to the prior-art FIG. 4b, the deviation between the L3 cell measurement and the strongest L3 beam measurement is smaller in FIG. 7b than FIG. 4b. This is reflected as well in FIG. 7c which shows that the difference (bias) between the L3 cell measurement and the strongest beam measurement has reduced significantly compared to prior-art as shown in FIG. 4c.

Some main advantages of the example embodiments of the invention are summarized in the following:
   The proposed solution derives a cell measurement quality based on the L1 beam filtered measurements that reflects better the UE radio conditions and in turn leads to more reliable handover decisions; and
   The solution builds on top of the current measurement model that is adopted by 3GPP and does not require a change in the order of the measurement blocks defined in FIG. 1.

FIG. 8A illustrates operations which may be performed by a network node such as, but not limited to, a UE 110 as in FIG. 2 or a mobile device. As shown in step 810 of FIG. 8A there is determining measurements of more than one communication beam established at a user equipment in a communication network. As shown in step 820 of FIG. 8A there is acquiring information associated with measurements of more than one communication beam established at a user equipment in a communication network. Then as shown in step 830 of FIG. 8A there is based on the information, deriving a cell measurement quantity as a function of the performed measurements of more than one communication beam.

In accordance with the example embodiments as described in the paragraph above, the information comprises at least one of an indication of at least one of a number of beams, L1 filtered beam measurements, L3 filtered beam measurements, and a threshold value for deriving the cell measurement quantity.

In accordance with the example embodiments as described in the paragraphs above, the cell measurement quantity is derived using a linear average of power values of L1 beam measurements corresponding to highest L3 filtered beam measurements that are above a threshold value, where the total number of beams used to derive the cell measurement quantity does not exceed the indicated number of beams.

In accordance with the example embodiments as described in the paragraphs above, the cell measurement quantity is derived using a linear average of power values of L1 beam measurements corresponding to highest L1 filtered beam measurements that are above a threshold value, where the total number of beams used to derive the cell measurement quantity does not exceed the indicated number of beams.

In accordance with the example embodiments as described in the paragraphs above, the cell measurement quantity is derived using a Synchronization Sequences and Physical Broadcast Channel block as a linear average of power values of highest beam measurement values above a threshold value, where a total number of beams used to derive the cell measurement quantity does not exceed the indicated number of beams.

In accordance with the example embodiments as described in the paragraphs above, the cell measurement quantity is derived using a Synchronization Sequences and Physical Broadcast Channel block as a linear average of power values of L1 beam measurement quantity values corresponding to highest L3 filtered beam measurement quantity values above a threshold, where the total number of beams used to derive the cell measurement quantity does not exceed the indicated number of beams.

In accordance with the example embodiments as described in the paragraphs above, the information is received over radio resource control signaling from the communication network.

In accordance with the example embodiments as described in the paragraphs above, the information is provided in an at least one information element.

In accordance with the example embodiments as described in the paragraphs above, there is signaling the communication network to indicate whether it is able to use the information to determine the cell measurement quantity.

In accordance with the example embodiments as described in the paragraphs above, there is applying the received information for cases if the number of beams used to derive the cell measurement quantity is set to 1, if the number of beams is not configured, and/or if the threshold is not configured, and/or the highest beam measurement is below the threshold.

In accordance with the example embodiments as described in the paragraphs above, there is applying the received information when determining at L1 that two or more of the more than one communication beam have similar receive power.

In accordance with the example embodiments as described in the paragraphs above, wherein determining if two or more of the more than one communication beam have similar receive power is based on whether the two or more communication beams fall within an offset provided by the communication network.

In accordance with the example embodiments as described in the paragraphs above, there is determining whether to apply the received information for deriving the cell measurement quantity.

A non-transitory computer-readable medium (Memory(ies) 125 as in FIG. 2) storing program code (Computer Program Code 123 and/or BCSR Module 140-2 and/or BCSR Module 140-1 as in FIG. 2), the program code executed by at least one processor (Processor(s) 120 and/or BCSR Module 140-2 and/or BCSR Module 140-1 as in FIG. 2) to perform the operations as at least described in the paragraphs above.

In accordance with an example embodiment of the invention as described above there is an apparatus comprising: means for determining (Computer Program Code 123 and/or BCSR Module 140-2 and/or BCSR Module 140-1; and Processor(s) 120 and/or BCSR Module 140-2 and/or BCSR Module 140-1 as in FIG. 2) measurements of more than one communication beam established at a user equipment (UE 110 as in FIG. 2) in a communication network (Network 100 as in FIG. 2). Means for acquiring (one or more transceivers 130, Computer Program Code 123 and/or BCSR Module 140-2 and/or BCSR Module 140-1; and Processor(s) 120 and/or BCSR Module 140-2 and/or BCSR Module 140-1 of FIG. 2) information associated with measurements of more than one communication beam established at a user equipment (UE 110 as in FIG. 2) in a communication network (Network 100 of FIG. 2). And means based on the information, for deriving (Computer Program Code 123 and/or BCSR Module 140-2 and/or BCSR Module 140-1; and Processor(s) 120 and/or BCSR Module 140-2 and/or BCSR Module 140-1 as in FIG. 2) a cell measurement quantity as a function of the performed measurements of more than one communication beam.

In the example aspect of the invention according to the paragraph above, wherein at least the means for determining, acquiring, and deriving comprises a non-transitory computer readable medium [Memory(ies) 125 as in FIG. 2] encoded with a computer program [Computer Program Code 123 and/or BCSR Module 140-2 and/or BCSR Module 140-1 as in FIG. 2)] executable by at least one processor [Processor(s) 120 and/or BCSR Module 140-2 and/or BCSR Module 140-1 as in FIG. 2].

FIG. 8B illustrates operations which may be performed by a network node such as, but not limited to, a gNB 170 and/or a gNB 180 as in FIG. 2. As shown in step 850 of FIG. 8B there is determining (Computer Program Code 153 and/or Computer Program Code 193, and/or BCSR Module 150-2 and/or BCSR Module 150-1, BCSR Module 199 and/or BCSR Module 180-1; and Processor(s) 152 and/or Processors 182 and/or BCSR Module 150-2 and/or BCSR Module 150-1, BCSR Module 199 and/or BCSR Module 180-1 as in FIG. 2) information associated with measurements of more than one communication beam established at a user equipment (UE 110 as in FIG. 2) in a communication network (Network 100 as in FIG. 2). Then as shown in step 860 of FIG. 8B there is, based on the determining, sending (one or more transceivers 160 and/or one or more transceivers 190 as in FIG. 2) the information to the user equipment to use in deriving a cell measurement quantity as a function of the performed measurements of more than one communication beam.

In accordance with the example embodiments as described in the paragraphs above, the information comprises at least one of an indication of at least one of a number of beams, L1 filtered beam measurements, L3 filtered beam measurements, and a threshold value for deriving the cell measurement quantity.

In accordance with the example embodiments as described in the paragraphs above, the cell measurement quantity is derived using a linear average of power values of L1 beam measurements corresponding to highest L3 filtered beam measurements that are above a threshold value, where the total number of beams used to derive the cell measurement quantity does not exceed the indicated number of beams.

In accordance with the example embodiments as described in the paragraphs above, the cell measurement quantity is derived using a linear average of power values of L1 beam measurements corresponding to highest L1 filtered beam measurements that are above a threshold value, where a total number of beams used to derive the cell measurement quantity does not exceed the indicated number of beams.

In accordance with the example embodiments as described in the paragraphs above, the cell measurement quantity is derived using a Synchronization Sequences and Physical Broadcast Channel block as a linear average of power values of highest beam measurement values above a threshold value, where a total number of beams to derive the cell measurement quantity does not exceed the indicated number of beams.

In accordance with the example embodiments as described in the paragraphs above, the cell measurement quantity is derived using a Synchronization Sequences and Physical Broadcast Channel block as a linear average of power values of L1 beam measurement quantity values corresponding to highest L3 filtered beam measurement quantity value above a threshold, where a total number of beams of the cell measurement quantity does not exceed the indicated number of beams.

In accordance with the example embodiments as described in the paragraphs above, the information comprises an indication of a number of communication beams of the more than one communication beam which have similar received powers for the user equipment to determine whether to use the received information.

In accordance with the example embodiments as described in the paragraphs above, the information comprises an offset for the user equipment to determine if two or more of the more than one communication beam have similar received power.

In accordance with the example embodiments as described in the paragraphs above, the information is provided in an at least one information element.

A non-transitory computer-readable medium (Memory(ies) 155 and/or memories 195 as in FIG. 2) storing program code (Computer Program Code 153 and/or Computer Program Code 193 and/or BCSR Module 150-2 and/or BCSR Module 150-1, BCSR Module 199 and/or BCSR Module 180-1 as in FIG. 2), the program code executed by at least one processor Processor(s) 152 and/or Processors 182 and/or BCSR Module 150-2 and/or BCSR Module 150-1, BCSR Module 199 and/or BCSR Module 180-1 as in FIG. 2).

In accordance with an example embodiment of the invention as described above there is an apparatus comprising: means for determining (Computer Program Code 153 and/or Computer Program Code 193, and/or BCSR Module 150-2 and/or BCSR Module 150-1, BCSR Module 199 and/or BCSR Module 180-1; and Processor(s) 152 and/or Processors 182 and/or BCSR Module 150-2 and/or BCSR Module 150-1, BCSR Module 199 and/or BCSR Module 180-1 as in FIG. 2) information associated with measurements of more than one communication beam established at a user equipment (UE 110 as in FIG. 2) in a communication network (Network 100 as in FIG. 2). And means, based on the determining, sending (one or more transceivers 160 and/or one or more transceivers 190 as in FIG. 2) the information to the user equipment (UE 110 as in FIG. 2) to use in deriving a cell measurement quantity as a function of the performed measurements of more than one communication beam.

In the example aspect of the invention according to the paragraph above, wherein at least the means for determining and sending comprises a non-transitory computer readable medium [Memory(ies) 155 and/or Memories 195 as in FIG. 2] encoded with a computer program [Computer Program Code 153 and/or Computer Program Code 193, and/or BCSR Module 150-2 and/or BCSR Module 150-1, BCSR Module 199 and/or BCSR Module 180-1 as in FIG. 2)] executable by at least one processor [Processor(s) 152 and/or Processors 182 and/or BCSR Module 150-2 and/or BCSR Module 150-1, BCSR Module 199 and/or BCSR Module 180-1 as in FIG. 2].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. An apparatus comprising:
   at least one processor; and
   at least one memory including computer program code, where the at least one memory and the computer program code are configured, with the at least one processor, to cause the apparatus to at least:
   measure at layer 1 (L1) a plurality of communication beams established at the apparatus in a communication network;
   apply layer 3 (L3) beam filtering on the L1 measurement of the the plurality of communication beams;
   select at least one communication beam satisfying one or more criteria based on the results of L3 beam filtering and information received from the communication network; and
   derive a cell measurement quantity using the L1 measurement of the at least one communication beam that has been selected.

2. The apparatus of claim 1, wherein the information comprises at least one of: an indication of a number of beams, and a threshold value.

3. The apparatus of claim 2, wherein the selecting at least one communication beam satisfying one or more criteria comprises selecting highest L3 filtered beam measurements that are above the threshold value, where the total number of beams does not exceed the indicated number of beams.

4. The apparatus of claim 2, wherein the apparatus is further caused to apply the received information for at least one of the cases: if the number of beams used to derive the cell measurement quantity is set to 1, if the number of beams is not configured, if the threshold is not configured, or the highest beam measurement is below the threshold.

5. The apparatus of claim 3, wherein the cell measurement quantity is derived using a linear average of power values of the L1 measurement of the at least one communication beam that has been selected.

6. The apparatus of claim 1, wherein the L1 measurement of the plurality of communication beams is performed on a synchronization sequences and physical broadcast channel block.

7. The apparatus of claim 1, wherein deriving the cell measurement quantity using the L1 measurement of the at least one communication beam that has been selected is performed when configured by the communication network.

8. The apparatus of claim 1, wherein the information comprises an indication to fall back to existing solution.

9. The apparatus of claim 1, wherein the information comprises an indication indicating whether to apply L1 beam filtering or L3 beam filtering for deriving the cell measurement quantity.

10. The apparatus of claim 1, wherein the apparatus is further caused to signal the communication network to indicate whether it is capable to use the information to derive the cell measurement quantity.

11. The apparatus of claim 1, wherein the apparatus is further caused to apply the received information when determining at L1 that two or more of the plurality of communication beams have similar receive power.

12. The apparatus of claim 11, wherein determining if two or more of the plurality of communication beams have similar receive power is based on whether the two or more communication beams fall within an offset provided by the communication network.

13. A method comprising:
   measuring, by a user equipment, at layer 1 (L1) a plurality of communication beams established at the user equipment in a communication network;
   applying layer 3 (L3) beam filtering on the L1 measurement of the plurality of communication beams;
   selecting at least one communication beam satisfying one or more criteria based on the results of L3 beam filtering and information received from the communication network;
   deriving a cell measurement quantity using the L1 measurement of the at least one communication beam that has been selected.

14. The method of claim 13, wherein the information comprises at least one of: an indication of a number of beams, and a threshold value.

15. The method of claim 14, wherein the selecting at least one communication beam satisfying one or more criteria comprises selecting highest L3 filtered beam measurements that are above the threshold value, where the total number of beams does not exceed the indicated number of beams.

16. The method of claim 14, further comprising: applying the information for at least one of the cases: if the number of beams used to derive the cell measurement quantity is set to 1, if the number of beams is not configured, if the threshold is not configured, or the highest beam measurement is below the threshold.

17. The method of claim 13, wherein the cell measurement quantity is derived using a linear average of power values of the L1 measurement of the at least one communication beam that has been selected.

18. The method of claim 13, further comprising: signaling the communication network to indicate whether the user equipment is capable to use the information to derive the cell measurement quantity.

19. The method of claim 13, further comprising: applying the information when determining that two or more of the plurality of communication beams have similar receive power.

20. An apparatus comprising:
   at least one processor; and
   at least one memory including computer program code, where the at least one memory and the computer program code are configured, with the at least one processor, to cause the apparatus to perform at least:
   determine information associated with measurements at layer 1 (L1) of a plurality of communication beams established at a user equipment in a communication network, wherein the information comprises L3 filtered beam measurements; and
   based on the determining, send the information to the user equipment to use in 1) applying layer 3 (L3) beam filtering on the L1 measurement of the plurality of communication beams, 2) selecting at least one communication beam satisfying one or more criteria based on the results of L3 beam filtering and 3) deriving a cell measurement quantity using the L1 measurements of the at least one communication beam that has been selected.

* * * * *